(12) United States Patent
Wu et al.

(10) Patent No.: US 10,579,594 B2
(45) Date of Patent: Mar. 3, 2020

(54) IMAGE SHARING METHOD AND APPARATUS, AND TERMINAL DEVICE

(71) Applicant: Huawei Technologies Co., Ltd., Shenzhen (CN)

(72) Inventors: Hao Wu, Shanghai (CN); Gang Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 15/537,814

(22) PCT Filed: Dec. 18, 2015

(86) PCT No.: PCT/CN2015/097916
§ 371 (c)(1),
(2) Date: Jun. 19, 2017

(87) PCT Pub. No.: WO2016/095857
PCT Pub. Date: Jun. 23, 2016

(65) Prior Publication Data
US 2017/0364531 A1 Dec. 21, 2017

(30) Foreign Application Priority Data
Dec. 19, 2014 (CN) .......................... 2014 1 0810429

(51) Int. Cl.
*G06F 16/176* (2019.01)
*H04N 1/00* (2006.01)
(Continued)

(52) U.S. Cl.
CPC ............ *G06F 16/176* (2019.01); *G06F 16/00* (2019.01); *G06F 16/51* (2019.01); *G06F 16/54* (2019.01);
(Continued)

(58) Field of Classification Search
None
See application file for complete search history.

(56) References Cited

U.S. PATENT DOCUMENTS 7,966,565 B2 * 6/2011 Dawson ............. H04N 1/00244
709/205
8,775,953 B2 * 7/2014 Schulz .................. G06T 3/4038
715/764
(Continued)

FOREIGN PATENT DOCUMENTS

CN 102025654 A 4/2011
CN 102622344 A 8/2012
(Continued)

OTHER PUBLICATIONS

Messieh, Nancy, "Create photo collages on your iPad/iPhone with PicStitch", Aug. 16, 2011, The Next Web, https://thenextweb.com/apps/2011/08/16/create-photo-collages-on-your-ipadiphone-with-pic-stitch/ (Year: 2011).*
(Continued)

*Primary Examiner* — Christopher J Fibbi
(74) *Attorney, Agent, or Firm* — Leydig, Voit & Mayer, Ltd.

(57) ABSTRACT

An image sharing method and a terminal device is provided. The image sharing method of the present invention includes: obtaining an image selected from a gallery by a user, and using the image as a to-be-shared image, where a quantity of the to-be-shared images is greater than a single-time maximum shareable-photo quantity allowed by a target sharing platform; and performing synthesis processing on at least two images of the to-be-shared images to obtain a processed to-be-shared image, where a quantity of the processed to-be-shared images is less than or equal to the single-time maximum shareable-photo quantity allowed by the target sharing platform.

12 Claims, 2 Drawing Sheets

Obtain an image selected from a gallery by a user, and use the image selected from the gallery by the user as a to-be-shared image, where a quantity of the to-be-shared images is greater than a single-time maximum shareable-photo quantity allowed by a target sharing platform — S110

Perform synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform — S120

Send the processed to-be-shared image to the target sharing platform — S130

(51) Int. Cl.

| | | |
|---|---|---|
| *G06T 3/40* | (2006.01) | |
| *G06F 16/51* | (2019.01) | |
| *G06F 16/54* | (2019.01) | |
| *G06F 16/58* | (2019.01) | |
| *H04L 29/08* | (2006.01) | |
| *G06F 16/00* | (2019.01) | |
| *G06F 3/0482* | (2013.01) | |
| *G06K 9/00* | (2006.01) | |

(52) U.S. Cl.
CPC .......... *G06F 16/5866* (2019.01); *H04L 29/08* (2013.01); *H04N 1/00442* (2013.01); *G06F 3/0482* (2013.01); *G06K 9/00221* (2013.01); *G06T 3/4038* (2013.01)

(56) References Cited

U.S. PATENT DOCUMENTS

| | | | |
|---|---|---|---|
| 2005/0237578 A1 | 10/2005 | Ikeda et al. | |
| 2009/0019392 A1* | 1/2009 | Nomura | G06F 16/54 715/810 |
| 2010/0199227 A1* | 8/2010 | Xiao | G06F 3/0481 715/863 |
| 2011/0064281 A1* | 3/2011 | Chan | G06Q 50/01 382/118 |
| 2011/0280497 A1 | 11/2011 | Berger et al. | |
| 2013/0314434 A1* | 11/2013 | Shetterly | G09G 5/14 345/593 |
| 2014/0078177 A1 | 3/2014 | Yamaji et al. | |
| 2014/0280652 A1 | 9/2014 | Yang et al. | |
| 2014/0304269 A1* | 10/2014 | Kiyohara | H04L 63/10 707/738 |
| 2015/0100577 A1 | 4/2015 | Hagiwara et al. | |

FOREIGN PATENT DOCUMENTS

| | | |
|---|---|---|
| CN | 102664819 A | 9/2012 |
| CN | 103119595 A | 5/2013 |
| CN | 103176969 A | 6/2013 |
| CN | 103327042 A | 9/2013 |
| CN | 104090879 A | 10/2014 |
| CN | 104184811 A | 12/2014 |
| EP | 2239703 A1 | 10/2010 |
| JP | 2004048284 A | 2/2004 |
| JP | 2007188380 A | 7/2007 |
| JP | 2010057073 A | 3/2010 |
| JP | 5532180 B1 | 6/2014 |
| KR | 20120080964 A | 7/2012 |
| WO | 2015043525 A1 | 4/2015 |

OTHER PUBLICATIONS

"Apple's iCloud Photostream limits have changed-full details and a few surprises too," Gavin's Gadgets, A Different View of Tech, XP05539473, pp. 1-4, (Nov. 27, 2013).
"TRV Online Application Documents Upload," XP055394799, CANADAVISA, pp. 1-5, (Jul. 15, 2013).
"Combine digital pictures by drag and drop operation; Understandable in accordance with purposes! Usable even by VISTA! Method of doing everything using free software", vol. 9, Nikkei PC Business, (2007).

* cited by examiner

IMAGE SHARING METHOD AND APPARATUS, AND TERMINAL DEVICE

CROSS-REFERENCE TO RELATED APPLICATIONS

This application is a National Stage of International Application No. PCT/CN2015/097916, filed on Dec. 18, 2015, which claims priority to Chinese Patent Application No. 201410810429.7, filed on Dec. 19, 2014, both of which are hereby incorporated by reference in their entireties.

TECHNICAL FIELD

The present disclosure relates to the field of communications technologies, and in particular, to an image sharing method and apparatus, and a terminal device.

BACKGROUND

Intelligent terminals are widely used in society nowadays. A multimedia function and a target sharing function in an intelligent terminal already become inelastic demand of users.

For image sharing, after a login to a target sharing platform, multiple photos may be selected in a gallery of an intelligent terminal and sent to the target sharing platform. For example, multiple photos selected from the gallery of the intelligent terminal are sent to WeChat, Weibo, and the like.

However, by means of a solution provided in the prior art, a quantity of images to be shared each time is limited. For example, WeChat and Weibo support sharing of at most nine images each time. Therefore, how to increase the quantity of images to be shared each time and satisfy users' diversified sharing requirements becomes a problem that needs to be resolved urgently.

SUMMARY

Embodiments of the present disclosure provide an image sharing method and apparatus, and a terminal device, to process to-be-shared images according to a single-time maximum shareable-photo quantity allowed by a target sharing platform, so as to obtain processed to-be-shared images. This resolves a problem in the prior art that when images are shared by using the target sharing platform, a quantity of images to be shared is limited.

According to a first aspect, an embodiment of the present disclosure provides an image sharing method, including:

obtaining an image selected from a gallery by a user, and using the image selected from the gallery by the user as a to-be-shared image, where a quantity of the to-be-shared images is greater than a single-time maximum shareable-photo quantity allowed by a target sharing platform;

performing synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform; and sending the processed to-be-shared image to the target sharing platform.

In a first possible implementation manner of the first aspect, before the obtaining an image selected from a gallery by a user, the method further includes:

grouping images in the gallery according to attribute information of the images in the gallery, to obtain at least one group of images of a same event, where the obtaining an image selected from a gallery by a user, and using the image selected from the gallery by the user as a to-be-shared image includes:

obtaining at least one group of images of a same event selected from the gallery by the user, and using the at least one group of images of a same event selected from the gallery by the user as the to-be-shared images.

According to the first possible implementation manner of the first aspect, in a second possible implementation manner, the grouping images in the gallery according to attribute information of the images in the gallery, to obtain at least one group of images of a same event includes:

grouping the images in the gallery according to at least one of piece of the following attribute information of the images in the gallery: time information, location information, object information, or photographing parameter information, to obtain the at least one group of images of a same event.

According to any one of the first aspect or the first to the second possible implementation manners of the first aspect, in a third possible implementation manner, the method further includes:

determining, according to a quantity of the images selected from the gallery by the user and the single-time maximum shareable-photo quantity allowed by the target sharing platform, an image template used by the processed to-be-shared image.

According to any one of the first aspect or the first to the third possible implementation manners of the first aspect, in a fourth possible implementation manner, the single-time maximum shareable-photo quantity of the target sharing platform is configured by the user or is obtained by a terminal from a network-side server.

According to any one of the first aspect or the first to the fourth possible implementation manners of the first aspect, in a fifth possible implementation manner, the method further includes:

obtaining, according to person portrait information selected in the to-be-shared image by the user, identification information of a person corresponding to the person portrait information; and sending, according to the identification information of the person, the to-be-shared image to a terminal device corresponding to the identification information of the person.

According to a second aspect, an embodiment of the present disclosure provides an image sharing apparatus, including:

an obtaining module, configured to: obtain an image selected from a gallery by a user, and use the image selected from the gallery by the user as a to-be-shared image, where a quantity of the to-be-shared images is greater than a single-time maximum shareable-photo quantity allowed by a target sharing platform;

a processing module, configured to perform synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform; and a sending module, configured to send the processed to-be-shared image to the target sharing platform.

In a first possible implementation manner of the second aspect, the processing module is further configured to: before the image selected from the gallery by the user is obtained, group images in the gallery according to attribute information of the images in the gallery, to obtain at least one group of images of a same event; and the obtaining module is specifically configured to obtain at least one group of images of a same event selected from the gallery by the user, and use the at least one group of images of a same event selected from the gallery by the user as the to-be-shared images.

With reference to the first possible implementation manner of the second aspect, in a second possible implementation manner, the processing module is specifically configured to group the images in the gallery according to at least one of piece of the following attribute information of the images in the gallery: time information, location information, object information, or photographing parameter information, to obtain the at least one group of images of a same event.

According to any one of the second aspect or the first to the second possible implementation manners of the second aspect, in a third possible implementation manner, the processing module is further configured to determine, according to a quantity of the images selected from the gallery by the user and the single-time maximum shareable-photo quantity allowed by the target sharing platform, an image template used by the processed to-be-shared image.

According to any one of the second aspect or the first to the third possible implementation manners of the second aspect, in a fourth possible implementation manner, the single-time maximum shareable-photo quantity of the target sharing platform is configured by the user or is obtained by a terminal from a network-side server.

According to any one of the second aspect or the first to the fourth possible implementation manners of the second aspect, in a fifth possible implementation manner, the processing module is further configured to: obtain, according to person portrait information selected in the to-be-shared image by the user, identification information of a person corresponding to the person portrait information; and send, according to the identification information of the person, the to-be-shared image to a terminal device corresponding to the identification information of the person.

According to a third aspect, an embodiment of the present disclosure provides a terminal device, including:

a processor, configured to: obtain an image selected from a gallery by a user, and use the image selected from the gallery by the user as a to-be-shared image, where a quantity of the to-be-shared images is greater than a single-time maximum shareable-photo quantity allowed by a target sharing platform; and perform synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform; and a sender, configured to send the processed to-be-shared image to the target sharing platform.

In a first possible implementation manner of the third aspect, the processor is further configured to: before obtaining the image selected from the gallery by the user, group images in the gallery according to attribute information of the images in the gallery, to obtain at least one group of images of a same event; and the processor is specifically configured to: obtain at least one group of images of a same event selected from the gallery by the user, and use the at least one group of images of a same event selected from the gallery by the user as the to-be-shared images.

With reference to the first possible implementation manner of the third aspect, in a second possible implementation manner, the processor is specifically configured to group the images in the gallery according to at least one of piece of the following attribute information of the images in the gallery: time information, location information, object information, or photographing parameter information, to obtain the at least one group of images of a same event.

According to any one of the third aspect or the first to the second possible implementation manners of the third aspect, in a third possible implementation manner, the processor is further configured to determine, according to a quantity of the images selected from the gallery by the user and the single-time maximum shareable-photo quantity allowed by the target sharing platform, an image template used by the processed to-be-shared image.

According to any one of the third aspect or the first to the third possible implementation manners of the third aspect, in a fourth possible implementation manner, the single-time maximum shareable-photo quantity of the target sharing platform is configured by the user or is obtained by the terminal device from a network-side server.

According to any one of the third aspect or the first to the fourth possible implementation manners of the third aspect, in a fifth possible implementation manner, the processor is further configured to: obtain, according to person portrait information selected in the to-be-shared image by the user, identification information of a person corresponding to the person portrait information; and send, according to the identification information of the person, the to-be-shared image to a terminal device corresponding to the identification information of the person.

According to the image sharing method and apparatus, and the terminal device of the embodiments of the present disclosure, an image selected from a gallery by a user is obtained, the image selected from the gallery by the user is used as a to-be-shared image, synthesis processing is performed on at least two images of the to-be-shared images according to a single-time maximum shareable-photo quantity allowed by a target sharing platform, to obtain a processed to-be-shared image, and the processed to-be-shared image is sent to the target sharing platform. In a case in which a quantity of the to-be-shared images that are selected by the user is greater than the single-time maximum shareable-photo quantity allowed by the target sharing platform, a quantity of the processed to-be-shared images obtained after the to-be-shared images are processed is less than or equal to the single-time maximum shareable-photo quantity allowed by the target sharing platform. Therefore, the to-be-shared images selected by the user may still be shared to the target sharing platform at a time. This resolves a problem that a quantity of to-be-shared images is limited, and increases a quantity of images to be shared to the target sharing platform.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
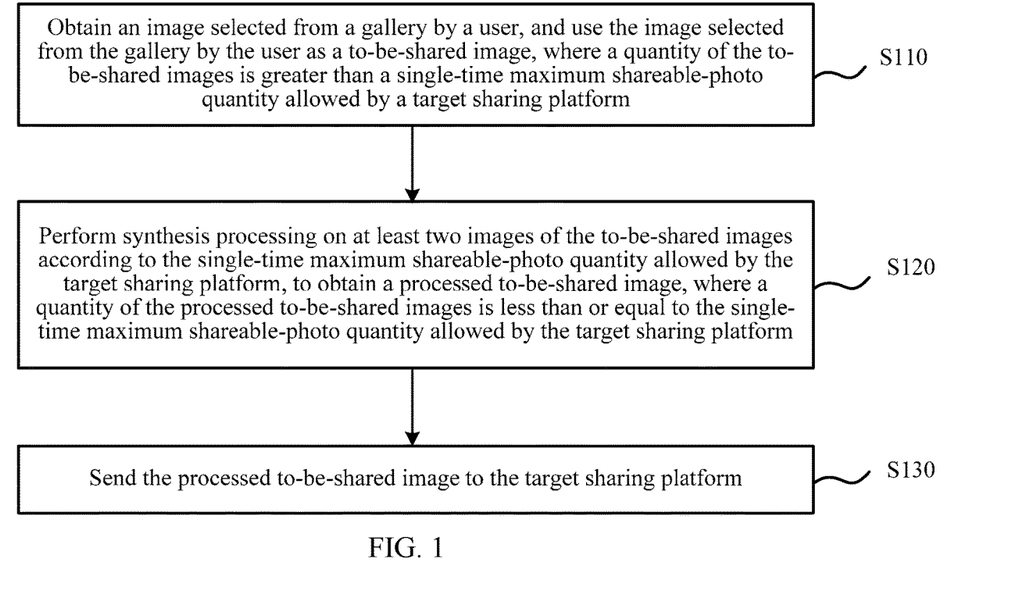
FIG. 1 is a flowchart of an image sharing method according to Embodiment 1 of the present disclosure.

FIG. 1 is a flowchart of an image sharing method according to Embodiment 1 of the present disclosure. The method in this embodiment is applicable to increasing a quantity of images to be shared to a target sharing platform. The method is executed by an image sharing apparatus, and the apparatus is usually implemented in a manner of hardware and/or software. The method in this embodiment includes the following steps.

S110: Obtain an image selected from a gallery by a user, and use the image selected from the gallery by the user as a to-be-shared image, where a quantity of the to-be-shared images is greater than a single-time maximum shareable-photo quantity allowed by a target sharing platform.

S120: Perform synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform.

For example, if a user selects 12 images in a gallery as to-be-shared images, and in the prior art, a single-time maximum shareable-photo quantity allowed by a target sharing platform is 9, all of the 12 images cannot be shared to the target sharing platform at a time in the prior art. However, in this embodiment, synthesis processing may be performed on at least two images of the 12 images selected from the gallery by the user, to obtain a processed to-be-shared image. For example, synthesis processing is performed on the 12 images, to obtain one processed to-be-shared image, or 5 images of the 12 images are synthesized into one image, and synthesis is not performed on the rest images. A quantity of the processed to-be-shared images is 8, so that the quantity of the processed to-be-shared images is less than or equal to the single-time maximum shareable-photo quantity allowed by the target sharing platform, that is, the quantity of the processed to-be-shared images obtained after the 12 images selected from the gallery by the user are processed is less than or equal to 9, and the process may go to S130. The processed to-be-shared image is sent to the target sharing platform.

S130: Send the processed to-be-shared image to the target sharing platform.

Specifically, the image selected from the gallery by the user is obtained, the image selected from the gallery by the user is used as the to-be-shared image, synthesis processing is performed on at least two images of the to-be-shared images according to the single-time maximum shareable-photo quantity allowed by the target sharing platform, to obtain the processed to-be-shared image, and the processed to-be-shared image is sent to the target sharing platform. This increases a quantity of images to be shared to the target sharing platform.

According to the image sharing method provided in this embodiment, an image selected from a gallery by a user is obtained, the image selected from the gallery by the user is used as a to-be-shared image, synthesis processing is performed on at least two images of the to-be-shared images according to a single-time maximum shareable-photo quantity allowed by a target sharing platform, to obtain a processed to-be-shared image, and the processed to-be-shared image is sent to the target sharing platform. In a case in which a quantity of the to-be-shared images that are selected by the user is greater than the single-time maximum shareable-photo quantity allowed by the target sharing platform, a quantity of the processed to-be-shared images obtained after the to-be-shared images are processed is less than or equal to the single-time maximum shareable-photo quantity allowed by the target sharing platform. Therefore, the to-be-shared images selected by the user may still be shared to the target sharing platform at a time. This resolves a problem that a quantity of to-be-shared images is limited, and increases a quantity of images to be shared to the target sharing platform.

Figure 2:
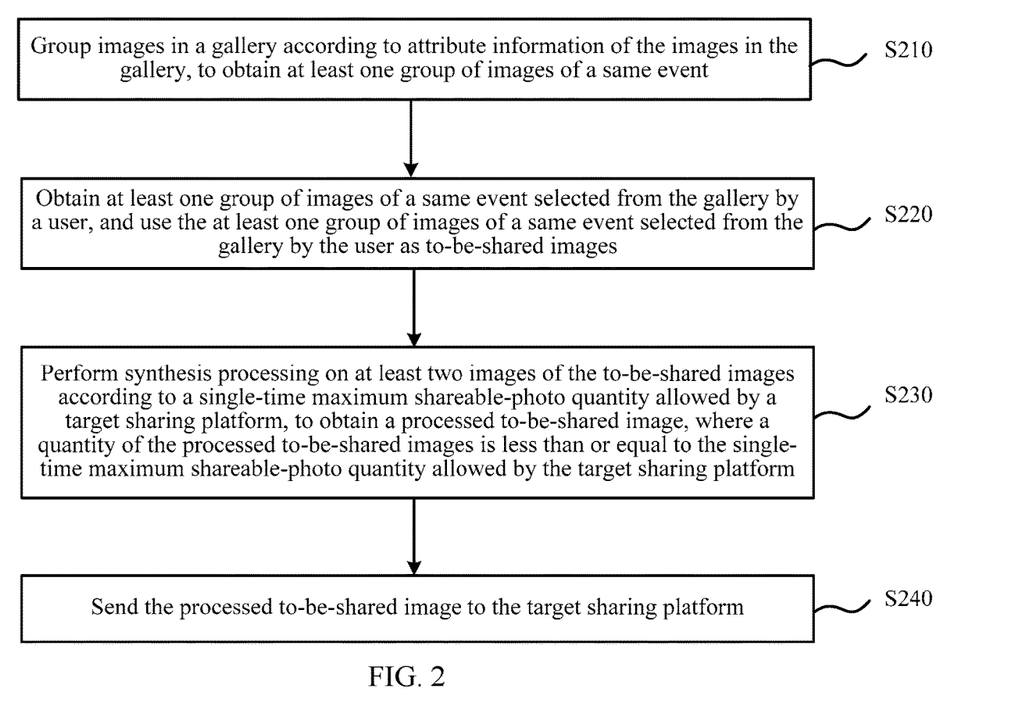
FIG. 2 is a flowchart of an image sharing method according to Embodiment 2 of the present disclosure.

Based on the foregoing embodiment, the foregoing embodiment is optimized in this embodiment. FIG. 2 is a flowchart of an image sharing method according to Embodiment 2 of the present disclosure. Referring to FIG. 2, the method in this embodiment may include:

S210: Group images in the gallery according to attribute information of the images in the gallery, to obtain at least one group of images of a same event.

For example, the grouping images in the gallery according to attribute information of the images in the gallery, to obtain at least one group of images of a same event may be implemented in the following manner:

grouping the images in the gallery according to at least one of piece of the following attribute information of the images in the gallery: time information, location information, object information, or photographing parameter information, to obtain the at least one group of images of a same event. It should be noted that the object information may include a face, a facial expression, an object (for example, a building, and signage such as a slogan or a signpost), a color, a background, and the like.

The images in the gallery may have the time information. If a Global Positioning System (GPS) function is enabled during photographing of the images, the images in the gallery may further have the location information. Therefore, the images in the gallery may be grouped according to at least one of the time information, the location information, the object information, or the photographing parameter information of the images in the gallery, to obtain the at least one group of images of a same event. If within a same time period, location information of an image is lost because of a network problem, the location information of this image may be determined according to location information of images before and after the image. If within the same time period, the location information of the image before this image is the same as the location information of the image after this image, it may be determined that this image has the location information same as the location information of the images and after this image.

For example, a person A attended a yacht wedding of a good friend at Shiliupu Pier on 1 Oct. 2014, and was very interested in the yacht wedding. The person enabled a GPS function of a smartphone, took many photos about the yacht wedding by using the smartphone, and saved these photos in a gallery. The saved photos about a yacht wedding event have time information and location information, and a group of images of the yacht wedding event may be obtained according to the time information and the location information that are of the photos of the yacht wedding event.

S220: Obtain at least one group of images of a same event selected from the gallery by a user, and use the at least one group of images of a same event selected from the gallery by the user as to-be-shared images.

If A selects a group of images of a same event from the gallery, the group of images of a same event are images of the yacht wedding of a good friend C that are taken at Shiliupu Pier on 1 Oct. 2014. An image sharing apparatus may obtain a group that is of images of the yacht wedding and that is selected from the gallery by A, and use the group of images of the yacht wedding as to-be-shared images.

S230: Perform synthesis processing on at least two images of the to-be-shared images according to a single-time maximum shareable-photo quantity allowed by a target sharing platform, to obtain a processed to-be-shared image, where a quantity of the processed to-be-shared images is less than or equal to the single-time maximum shareable-photo quantity allowed by the target sharing platform.

The single-time maximum shareable-photo quantity of the target sharing platform may be configured by the user or may be obtained by a terminal from a network-side server. The single-time maximum shareable-photo quantity corresponding to the target sharing platform may be stored in the network-side server.

At least two images of the to-be-shared images are synthesized according to the single-time maximum shareable-photo quantity allowed by the target sharing platform, so as to obtain the processed to-be-shared image. For example, if A wants to send, to WeChat, the group of images of the yacht wedding selected by A, and a single-time maximum shareable-photo quantity allowed by the WeChat platform is 9, if there are in total 20 images of the yacht wedding, the image sharing apparatus may synthesize at least two images in the group of the images of the yacht wedding, and a quantity of the obtained processed to-be-shared images is less than or equal to the single-time maximum shareable-photo quantity allowed by the target sharing platform. For example, 20 images are synthesized into one long photo, and the long photo is the processed to-be-shared image, or 20 images are synthesized into 4 long photos, each long photo includes 5 images, and the 4 long photos are the processed to-be-shared images. It should be noted that a quantity of long photos to synthesize from 20 images may be determined according to a selection of the user. For example, if the user selects to synthesize 20 images into one long photo, the image sharing apparatus may synthesize 20 images into one long photo. An image template used to synthesize the long photo may be determined according to a quantity of images selected from the gallery by the user and the single-time maximum shareable-photo quantity allowed by the target sharing platform. For example, the quantity of the images selected from the gallery by the user is 10, the single-time maximum shareable-photo quantity allowed by the target sharing platform is 1, a template for splicing 10 images into 1 long photo is determined to be used. If the single-time maximum shareable-photo quantity allowed by the target sharing platform is 4, a template for splicing 10 images into 1 long photo, a template for splicing 10 images into 2 long photos, a template for splicing 10 images into 3 long photos, or a template for splicing 10 images into 4 long photos may be determined.

S240: Send the processed to-be-shared image to the target sharing platform.

B also took images of the yacht wedding of the good friend C at Shiliupu Pier on 1 Oct. 2014. B used an ordinary mobile phone, and photos taken by B were laid out among all photos in a gallery like ordinary photos. If B wants to share multiple photos at a time, B has to first exit the gallery, open a WeChat application, and enter, by using a sharing portal of WeChat, the gallery to reselect a photo. However, at most 9 images can be selected at a time in WeChat. Among many satisfying photos, B finds it difficult to choose one over another. It takes 3 minutes to select photos and share the photos to WeChat, while A may share 20 images of the yacht wedding selected by A to the WeChat platform at a time, and only 30 seconds is taken. It should be noted that the image sharing apparatus may edit the processed to-be-shared image, where the editing includes, but is not limited to, adding or deleting an image, applying a filter, clipping, and adding a text or an emoticon, so as to make images sent the target sharing platform more beautiful.

It should be noted that the user may add a mark to a person in whom the user is interested in the to-be-shared images, for example, may circle a portrait of a person in the to-be-shared images. The image sharing apparatus may obtain, according to person portrait information selected in a to-be-shared image by the user, identification information of a person corresponding to the person portrait information, and send, according to the identification information of the person, the to-be-shared image to a terminal device corresponding to the identification information of the person. The identification information of the person may be a name, a phone number, a WeChat account, a mail address, and the like of the person.

According to the image sharing method provided in this embodiment, images in a gallery are grouped according to attribute information of the images in the gallery, to obtain at least one group of images of a same event, at least one group of images of a same event selected from the gallery by the user is obtained, the at least one group of images of a same event selected from the gallery by the user is used as to-be-shared images, synthesis processing is performed on at least two images of the to-be-shared images according to a single-time maximum shareable-photo quantity allowed by a target sharing platform, to obtain a processed to-be-shared image, and the processed to-be-shared image is sent to the target sharing platform. In a case in which a quantity of the to-be-shared images that are selected by the user is greater than the single-time maximum shareable-photo quantity allowed by the target sharing platform, a quantity of the processed to-be-shared images obtained after the to-be-shared images are processed is less than or equal to the single-time maximum shareable-photo quantity allowed by the target sharing platform. Therefore, the to-be-shared images selected by the user may still be shared to the target sharing platform at a time. This resolves a problem that a quantity of to-be-shared images is limited, and increases a quantity of images to be shared to the target sharing platform.

Figure 3:
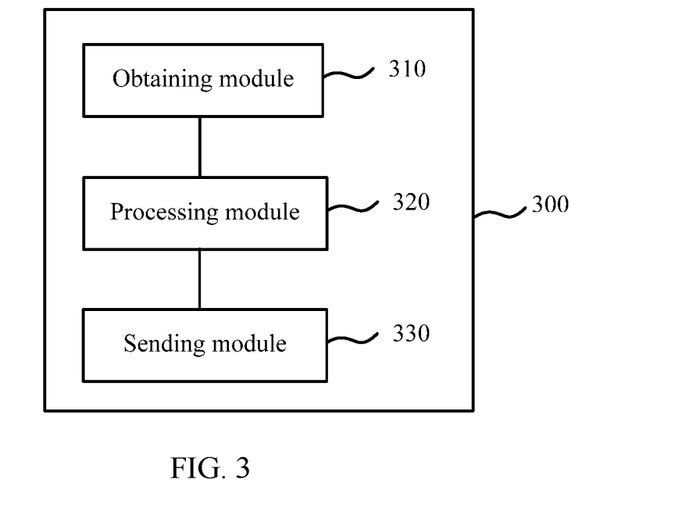
FIG. 3 is a schematic structural diagram of an image sharing apparatus 300 according to Embodiment 3 of the present disclosure.

FIG. 3 is a schematic structural diagram of an image sharing apparatus 300 according to Embodiment 3 of the present disclosure. The image sharing apparatus provided in this embodiment may be configured to execute the technical solution of the method embodiment shown in FIG. 1. Referring to FIG. 3, the image sharing apparatus includes: an obtaining module 310, a processing module 320, and a sending module 330.

The obtaining module 310 is configured to: obtain an image selected from a gallery by a user, and use the image selected from the gallery by the user as a to-be-shared image, where a quantity of the to-be-shared images is greater than a single-time maximum shareable-photo quantity allowed by a target sharing platform. The processing module 320 is configured perform synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform. The sending module 330 is configured to send the processed to-be-shared image to the target sharing platform.

According to the image sharing apparatus provided in this embodiment, the image selected from the gallery by the user is obtained, the image selected from the gallery by the user is used as the to-be-shared image, synthesis processing is performed on at least two images of the to-be-shared images according to the single-time maximum shareable-photo quantity allowed by the target sharing platform, to obtain the processed to-be-shared image, and the processed to-be-shared image is sent to the target sharing platform. In a case in which a quantity of the to-be-shared images that are selected by the user is greater than the single-time maximum shareable-photo quantity allowed by the target sharing platform, a quantity of the processed to-be-shared images obtained after the to-be-shared images are processed is less than or equal to the single-time maximum shareable-photo quantity allowed by the target sharing platform. Therefore, the to-be-shared images selected by the user may still be shared to the target sharing platform at a time. This resolves a problem that a quantity of to-be-shared images is limited, and increases a quantity of images to be shared to the target sharing platform.

Further, the processing module 320 is further configured to: before the image selected from the gallery by the user is obtained, group images in the gallery according to attribute information of the images in the gallery, to obtain at least one group of images of a same event.

The obtaining module 310 is specifically configured to obtain at least one group of images of a same event selected from the gallery by the user, and use the at least one group of images of a same event selected from the gallery by the user as to-be-shared images.

Further the processing module 320 is specifically configured to group the images in the gallery according to at least one of piece of the following attribute information of the images in the gallery: time information, location information, object information, or photographing parameter information, to obtain the at least one group of images of a same event. It should be noted that the object information may include a face, a facial expression, an object (for example, a building, and signage such as a slogan or a signpost), a color, a background, and the like.

Further the processing module 320 is further configured to determine, according to a quantity of the images selected from the gallery by the user and the single-time maximum shareable-photo quantity allowed by the target sharing platform, an image template used by the processed to-be-shared image.

Further, the single-time maximum shareable-photo quantity of the target sharing platform is configured by the user or is obtained by a terminal from a network-side server.

Further, the processing module 320 is further configured to: obtain, according to person portrait information selected in the to-be-shared image by the user, identification information of a person corresponding to the person portrait information; and send, according to the identification information of the person, the to-be-shared image to a terminal device corresponding to the identification information of the person.

Figure 4:
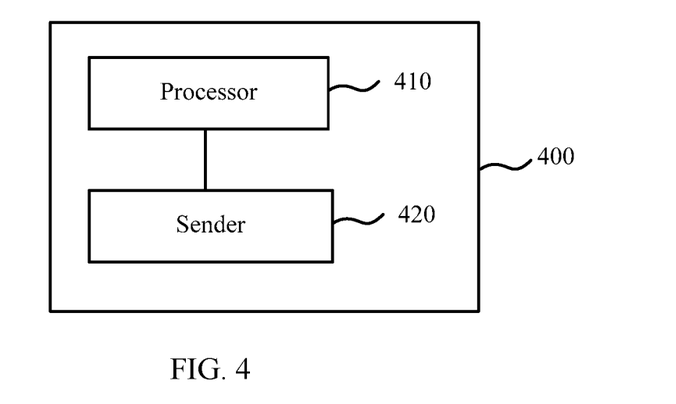
FIG. 4 is a schematic structural diagram of a terminal device 400 according to Embodiment 4 of the present disclosure.

FIG. 4 is a schematic structural diagram of a terminal device 400 according to Embodiment 4 of the present disclosure. The terminal device provided in this embodiment may be configured to execute the technical solution of the method embodiment shown in FIG. 1. Referring to FIG. 4, the terminal device includes a processor 410 and a sender 420.

The processor 410 is configured to: obtain an image selected from a gallery by a user, and use the image selected from the gallery by the user as a to-be-shared image, where a quantity of the to-be-shared images is greater than a single-time maximum shareable-photo quantity allowed by a target sharing platform; and perform synthesis processing on at least two images of the to-be-shared images according to the single-time maximum shareable-photo quantity allowed by the target sharing platform, to obtain a processed to-be-shared image, where a quantity of the processed to-be-shared images is less than or equal to the single-time maximum shareable-photo quantity allowed by the target sharing platform. The sender 420 is configured to send the processed to-be-shared image to the target sharing platform.

According to the terminal device provided in this embodiment, the image selected from the gallery by the user is obtained, the image selected from the gallery by the user is used as the to-be-shared image, synthesis processing is performed on at least two images of the to-be-shared images according to the single-time maximum shareable-photo quantity allowed by the target sharing platform, to obtain the processed to-be-shared image, and the processed to-be-shared image is sent to the target sharing platform. In a case in which a quantity of the to-be-shared images that are selected by the user is greater than the single-time maximum shareable-photo quantity allowed by the target sharing platform, a quantity of the processed to-be-shared images obtained after the to-be-shared images are processed is less than or equal to the single-time maximum shareable-photo quantity allowed by the target sharing platform. Therefore, the to-be-shared images selected by the user may still be shared to the target sharing platform at a time. This resolves a problem that a quantity of to-be-shared images is limited, and increases a quantity of images to be shared to the target sharing platform.

Further, the processor 410 is further configured to: before the image selected from the gallery by the user is obtained, group images in the gallery according to attribute information of the images in the gallery, to obtain at least one group of images of a same event.

The processor 410 is specifically configured to obtain at least one group of images of a same event selected from the gallery by the user, and use the at least one group of images of a same event selected from the gallery by the user as to-be-shared images.

The processor 410 is specifically configured to group the images in the gallery according to at least one of piece of the following attribute information of the images in the gallery: time information, location information, object information, or photographing parameter information, to obtain the at least one group of images of a same event. It should be noted that the object information may include a face, a facial expression, an object (for example, a building, and signage such as a slogan or a signpost), a color, a background, and the like.

Further the processor 410 is further configured to determine, according to a quantity of the images selected from the gallery by the user and the single-time maximum shareable-photo quantity allowed by the target sharing platform, an image template used by the processed to-be-shared image.

Further, the single-time maximum shareable-photo quantity of the target sharing platform is configured by the user or is obtained by the terminal device from a network-side server.

Further, the processor 410 is further configured to: obtain, according to person portrait information selected in the to-be-shared image by the user, identification information of a person corresponding to the person portrait information; and send, according to the identification information of the person, the to-be-shared image to a terminal device corresponding to the identification information of the person.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An image sharing method, comprising:
   obtaining, by a processor, a plurality of images selected from a gallery by a user, and using the plurality of images selected from the gallery by the user as to-be-shared images, wherein the processor determines that a quantity of the to-be-shared images is greater than a single-time maximum shareable-photo quantity allowed by a target sharing platform;
   in response to determining that the quantity of the to-be-shared images is greater than the single-time maximum shareable-photo quantity allowed by the target sharing platform, automatically performing, by the processor, synthesis processing on at least two images of the to-be-shared images according to the single-time maximum shareable-photo quantity allowed by the target sharing platform, to obtain at least one processed to-be-shared image, wherein a quantity of the processed to-be-shared images is less than or equal to the single-time maximum shareable-photo quantity allowed by the target sharing platform, wherein performing the synthesis processing comprises splicing a first number of the to-be-shared images into a second number of processed to-be-shared images, wherein the second number is less than the first number; and
   causing, by the processor, the at least one processed to-be-shared image to be sent to the target sharing platform.

2. The method according to claim 1, before the obtaining the plurality of images selected from the gallery by the user, further comprising:
   grouping images in the gallery according to attribute information of the images in the gallery, to obtain at least one group of images of a same event,
   wherein the obtaining the plurality of images selected from the gallery by the user, and using the plurality of images selected from the gallery by the user as the to-be-shared image comprises:
      obtaining at least one group of images of a same event selected from the gallery by the user, and using the at least one group of images of the same event selected from the gallery by the user as the to-be-shared images.

3. The method according to claim 2, wherein the grouping images in the gallery according to attribute information of the images in the gallery, to obtain the at least one group of images of the same event comprises:
   grouping the images in the gallery according to at least one of piece of the following attribute information of the images in the gallery: time information, location information, object information, or photographing parameter information, to obtain the at least one group of images of the same event.

4. The method according to claim 1, further comprising:
   determining, according to a quantity of the plurality of images selected from the gallery by the user and the single-time maximum shareable-photo quantity allowed by the target sharing platform, an image template used by the at least one processed to-be-shared image.

5. The method according to claim 1, wherein the single-time maximum shareable-photo quantity allowed by the target sharing platform is configured by the user or is obtained by a terminal device from a network-side server.

6. The method according to claim 1, further comprising:
   obtaining, according to person portrait information selected in the to-be-shared images by the user, identification information of a person corresponding to the person portrait information; and
   sending, according to the identification information of the person, the to-be-shared images to a terminal device corresponding to the identification information of the person.

7. A terminal device, comprising:
   a computer-readable storage medium storing a program; and
   a processor, configured to execute the program to cause the terminal device to:
      obtain a plurality of images selected from a gallery by a user, and use the plurality of images selected from the gallery by the user as to-be-shared images, wherein the processor determines that a quantity of the to-be-shared images is greater than a single-time maximum shareable-photo quantity allowed by a target sharing platform;

in response to determining that the quantity of the to-be-shared images is greater than the single-time maximum shareable-photo quantity allowed by the target sharing platform, automatically perform synthesis processing on at least two images of the to-be-shared images according to the single-time maximum shareable-photo quantity allowed by the target sharing platform, to obtain at least one processed to-be-shared image, wherein a quantity of the processed to-be-shared images is less than or equal to the single-time maximum shareable-photo quantity allowed by the target sharing platform, wherein performing the synthesis processing comprises splicing a first number of the to-be-shared images into a second number of processed to-be-shared images, wherein the second number is less than the first number; and send the at least one processed to-be-shared image to the target sharing platform.

8. The terminal device according to claim 7, wherein the processor is further configured to execute the program to cause the terminal device to:

before obtaining the plurality of images selected from the gallery by the user, group images in the gallery according to attribute information of the images in the gallery, to obtain at least one group of images of a same event; and obtain at least one group of images of the same event selected from the gallery by the user, and use the at least one group of images of the same event selected from the gallery by the user as the to-be-shared images.

9. The terminal device according to claim 8, wherein the processor is further configured to execute the program to cause the terminal device to:

group the images in the gallery according to at least one of piece of the following attribute information of the images in the gallery: time information, location information, object information, or photographing parameter information, to obtain the at least one group of images of the same event.

10. The terminal device according to claim 7, wherein the processor is further configured to execute the program to cause the terminal device to:

determine, according to a quantity of the plurality of images selected from the gallery by the user and the single-time maximum shareable-photo quantity allowed by the target sharing platform, an image template used by the at least one processed to-be-shared image.

11. The terminal device according to claim 7, wherein the single-time maximum shareable-photo quantity of the target sharing platform is configured by the user or is obtained by the terminal device from a network-side server.

12. The terminal device according to claim 7, wherein the processor is further configured to execute the program to cause the terminal device to:

obtain, according to person portrait information selected in the to-be-shared images by the user, identification information of a person corresponding to the person portrait information; and send, according to the identification information of the person, the to-be-shared images to a terminal device corresponding to the identification information of the person.

* * * * *